Aug. 29, 1961 A. H. FOTSCH ET AL 2,998,333
MACHINE TOOL FOR REMOVING MATERIAL FROM A CONTAINER
Filed May 4, 1955 5 Sheets-Sheet 1

INVENTORS
Arthur H. Fotsch, &
Ervin J. Kielma
BY
Elroy J. Wuitschel
Attorney

INVENTORS
Arthur H. Fotsch, &
Ervin J. Kielma
BY
Attorney

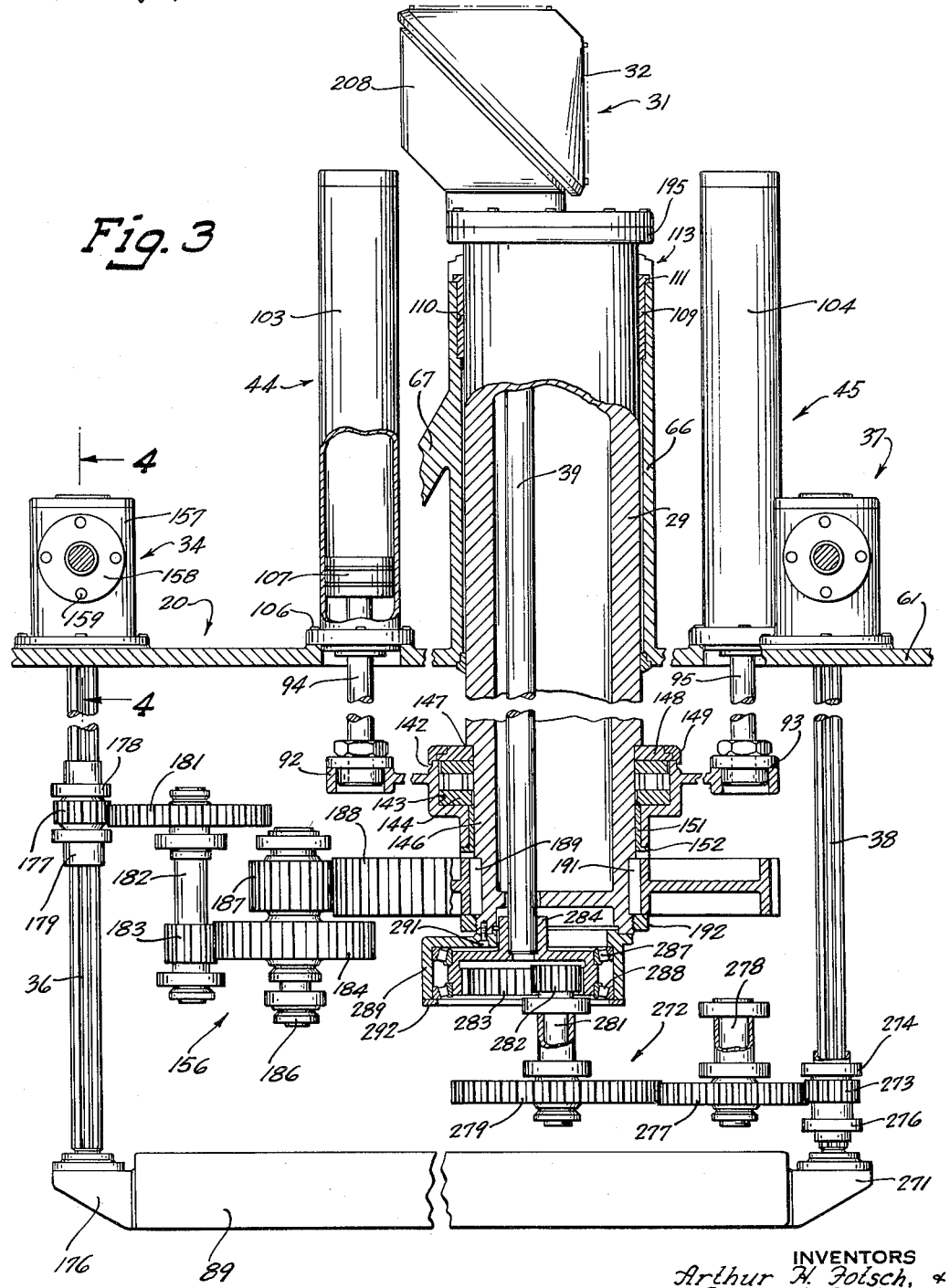

Aug. 29, 1961  A. H. FOTSCH ET AL  2,998,333
MACHINE TOOL FOR REMOVING MATERIAL FROM A CONTAINER
Filed May 4, 1955  5 Sheets-Sheet 4
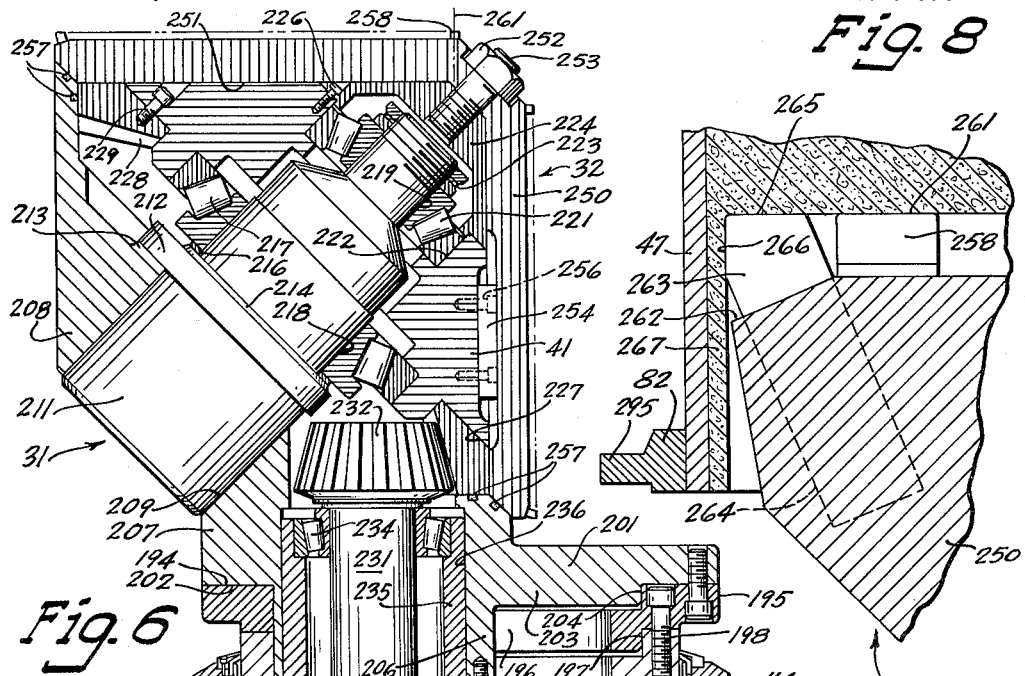
Fig. 8
Fig. 6
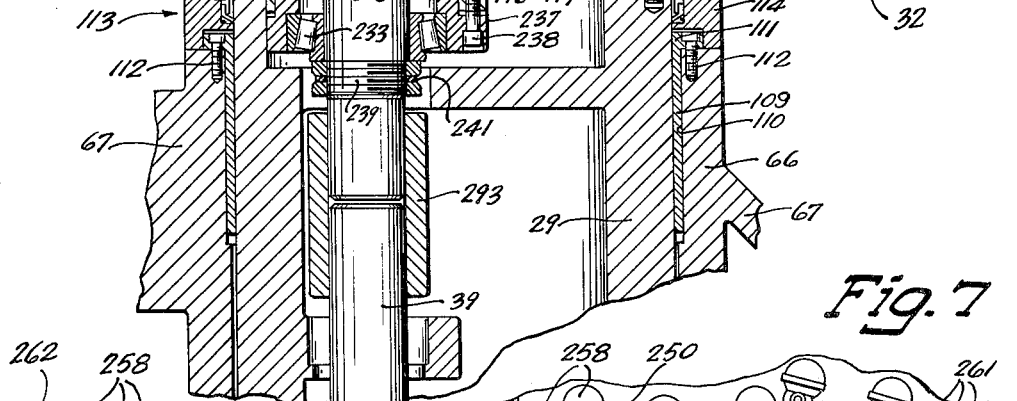
Fig. 7
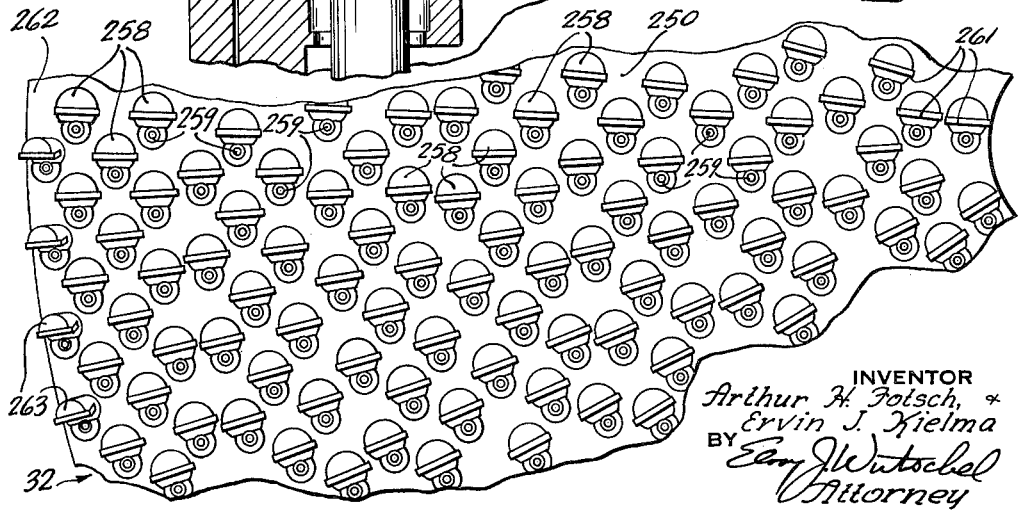
INVENTOR
Arthur H. Fotsch, &
Ervin J. Kielma
BY
Attorney Aug. 29, 1961 A. H. FOTSCH ET AL 2,998,333
MACHINE TOOL FOR REMOVING MATERIAL FROM A CONTAINER
Filed May 4, 1955 5 Sheets-Sheet 5
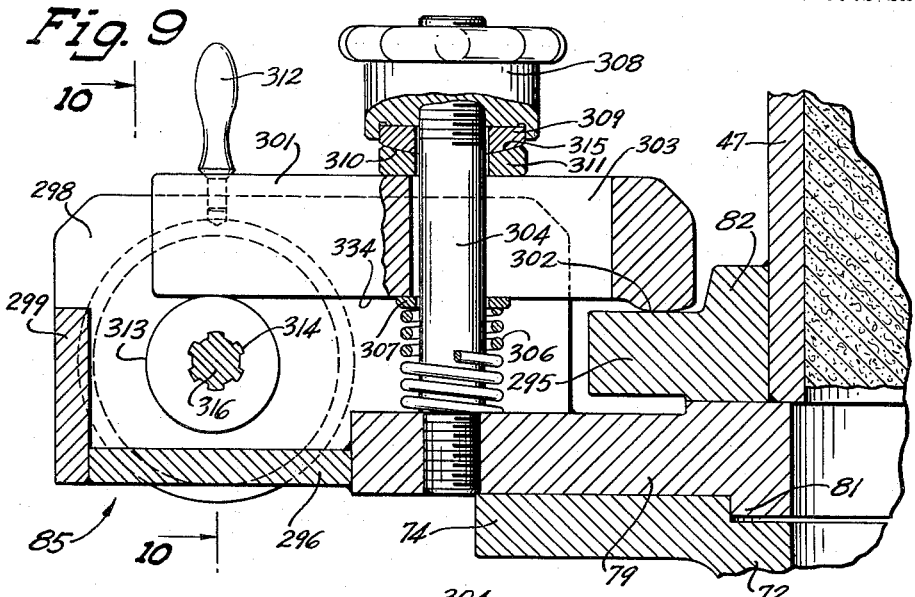
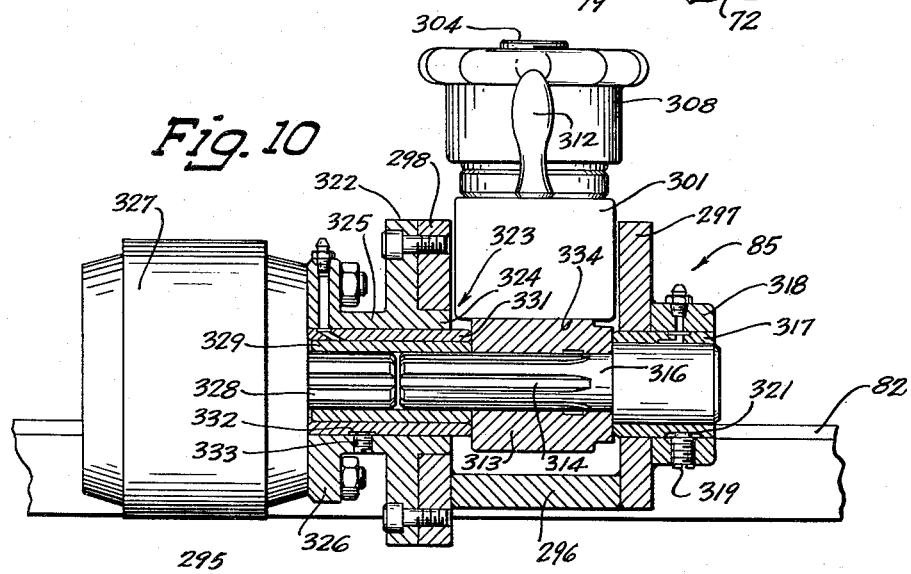
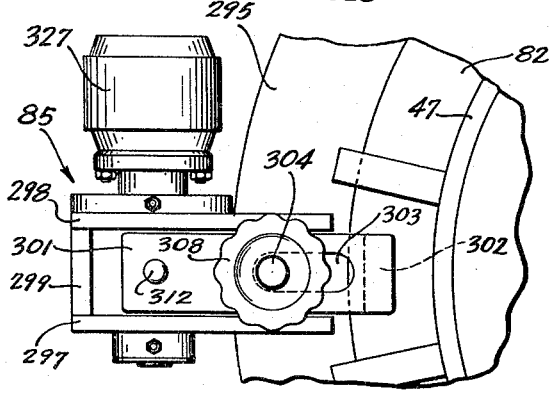
INVENTORS
Arthur H. Fotsch, &
Ervin J. Kielma.
BY
Ervin J. Wutschel
Attorney

United States Patent Office 2,998,333
Patented Aug. 29, 1961

2,998,333
MACHINE TOOL FOR REMOVING MATERIAL
FROM A CONTAINER
Arthur H. Fotsch, Wauwatosa, and Ervin J. Kielma, Milwaukee, Wis., assignors to Kearney & Trecker Corporation, West Allis, Wis., a corporation of Wisconsin
Filed May 4, 1955, Ser. No. 506,042
17 Claims. (Cl. 134—8)

This invention relates generally to machine tools, and more particularly to a milling machine especially adapted to remove material from a container.

In removing titanium sponge from a crucible it is desirable that the sponge be removed in the form of uniform chips, for subsequent processing. Since titanium is an extremely reactive metal at elevated temperatures, the milling machine must be so constructed as to feed the cutter into the crucible at a slow even rate. The cutter must be able to remove the sponge from the crucible at a uniform rate and produce chips of a uniform desirable size. While the titanium sponge within the crucible is generally pure titanium, a portion of the sponge mass adjacent to the walls of the crucible absorbs impurities from the crucible to render it unfit for further processing. Therefore it is necessary for the milling machine to be capable of feeding the cutter into the sponge mass so that its central portion of pure titanium will be removed and the impure titanium will remain within the crucible.

It is therefore a general object of the present invention to provide an improved machine tool especially adapted to remove a mass of material from a container.

Another object of the invention is to provide a milling machine particularly adapted to operate upon solidified metal in a container to reduce it to chips for the purpose of removing the metal from the container.

Another object of the invention is to provide a milling machine for removing a mass of metal from a container by transforming the mass to chips and having means for removing the chips from the machine into a suitable receptacle.

A further object of the present invention is to provide a milling machine for machining a mass of pure metal out of a container in such a manner as to leave the exterior portion of the mass adjacent to the wall of the container containing impure metal within the container.

A further object of the invention is to provide a machine tool having a cutter supported on an axially movable ram.

Another object of the present invention is to provide a machine tool capable of rotating a cutter head about one axis while the cutter is capable of being rotated about another axis.

Another object of the invention is to provide a machine tool having a separate power transmission for moving the ram axially, a separate power transmission for rotating the ram while it is being moved axially, and a separate power transmission for driving a spindle while the ram is being rotated and moved axially.

Another object of the invention is to provide a cutter especially adaptable for removing a mass of metal from a cylindrical container.

Another object of the invention is to provide a novel cone shaped cutter.

Another object of the invention is to provide a cutter which produces a chip having a uniform cross-section.

Another object of the invention is to provide a conical shaped cutter having a plurality of inserted bits.

Another object of the invention is to provide a cutter on which the chip load will be uniform throughout.

According to this invention there is provided an improved milling machine arranged for the specific purpose of machining refined metal sponge out of the crucible in which it is contained. It comprises a base or main frame, having secured to it a depending subframe. The subframe slidably supports a driving head for axial movement in a vertical plane. The driving head rotatably supports one end of a ram which is adapted to move axially with the head. The opposite end of the ram extends through the main frame and is rotatably and slidably supported therein. A cutter head is secured to the extending end of the ram and supports a spindle for rotatably driving a cutter mounted on the cutter head. The spindle is connected to be driven by a drive shaft which is journalled in the ram and extends downwardly therefrom into the driving head where it is operably connected to a spindle drive transmission. The driving head also contains a ram drive transmission for rotating the ram. Each of the transmissions are separate and independently actuated by power from separate sources. The opposite end of the main frame fixedly supports the crucible containing the metal sponge in an inverted position to present the open end of the crucible to the cutter head secured to the end of the ram. To effect the machining operation, the ram is moved upwardly into the crucible while it is being rotated. Thus, the cutter head, which is offset relative to the axis of the ram, is caused to revolve around the axis of the ram in a spiral feeding movement, while the cutter is rotated about its own axis. Since the crucible is carried on the main frame with its open end facing downwardly, the chips produced by the cutter, will fall out of the crucible. A conduit is provided for receiving these chips and carries them into a suitable receptacle.

The foregoing and other objects of this invention, which will become more fully apparent from the following detailed description, may be achieved by the particular illustrative machine tool depicted and described in connection with the accompanying drawings, in which:

FIG. 3 is a schematic vertical view of the machine tool showing both gear transmissions and the associated drive connections;

FIG. 5 is an enlarged detail view in vertical section illustrating the construction of the wiper ring;

FIG. 6 is an enlarged view in vertical section through the cutter head and cutter mounted on the ram;

FIG. 7 is an enlarged fragmentary view of the cutter showing the relative positions of the cutting bits;

FIG. 8 is an enlarged detail elevational view of one of the end cutting bits;

FIG. 9 is a sectional view in elevation depicting the clamping mechanism employed to clamp the container to the machine;

FIG. 10 is a view partly in elevation and partly in vertical section taken along the plane represented by the line 10—10 in FIG. 9; and, FIG. 11 is a plan view of one of the clamping mechanisms in place on the machine.

Figure 1:
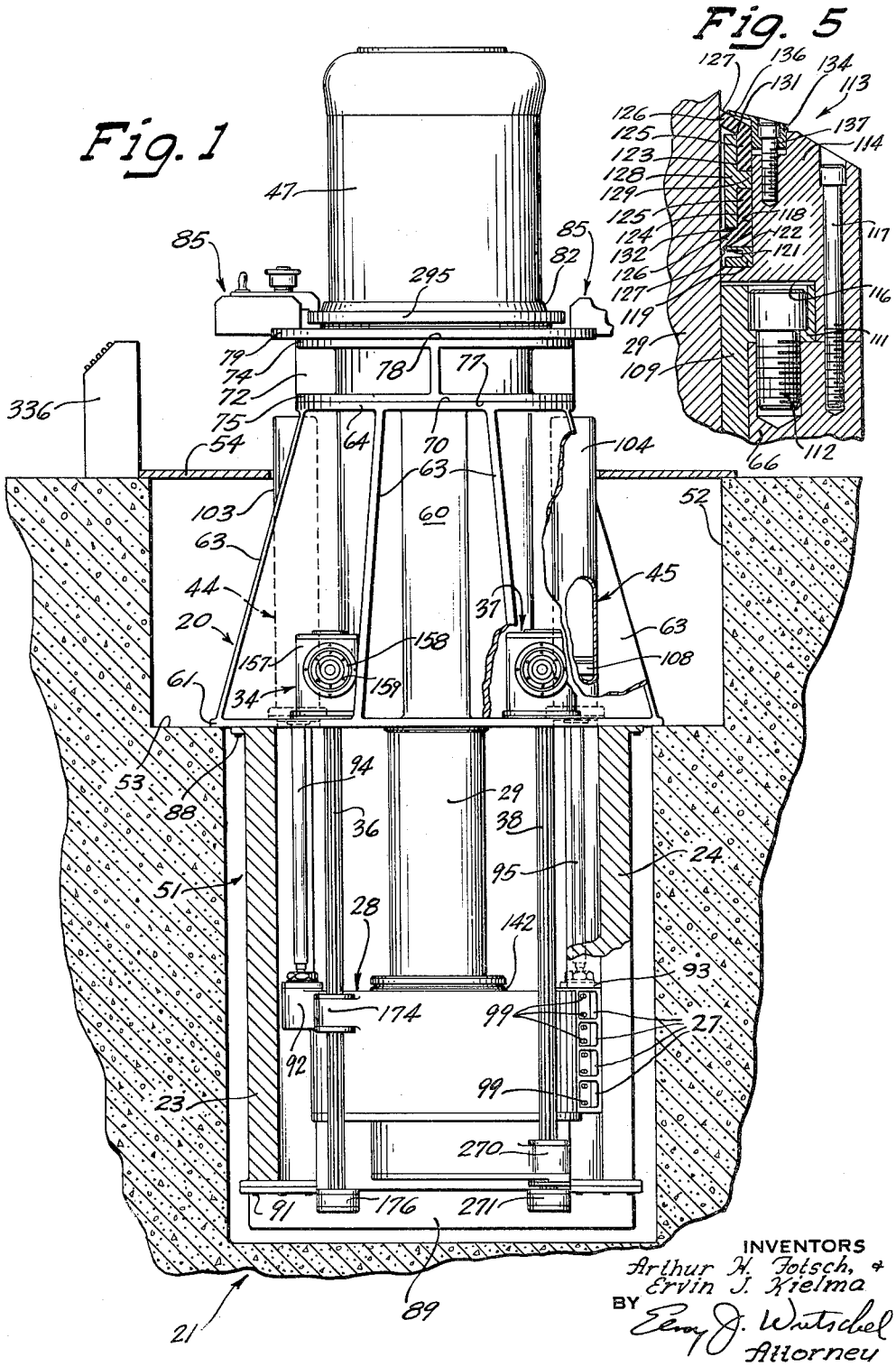
FIGURE 1 is a view in elevation of the machine tool with parts broken away to show one of the piston and cylinder mechanisms employed to actuate the ram head, and one of the side frames broken away to show a set of gibs mounted on the head for slidably guiding the ram head in a straight line movement.
Figure 2:
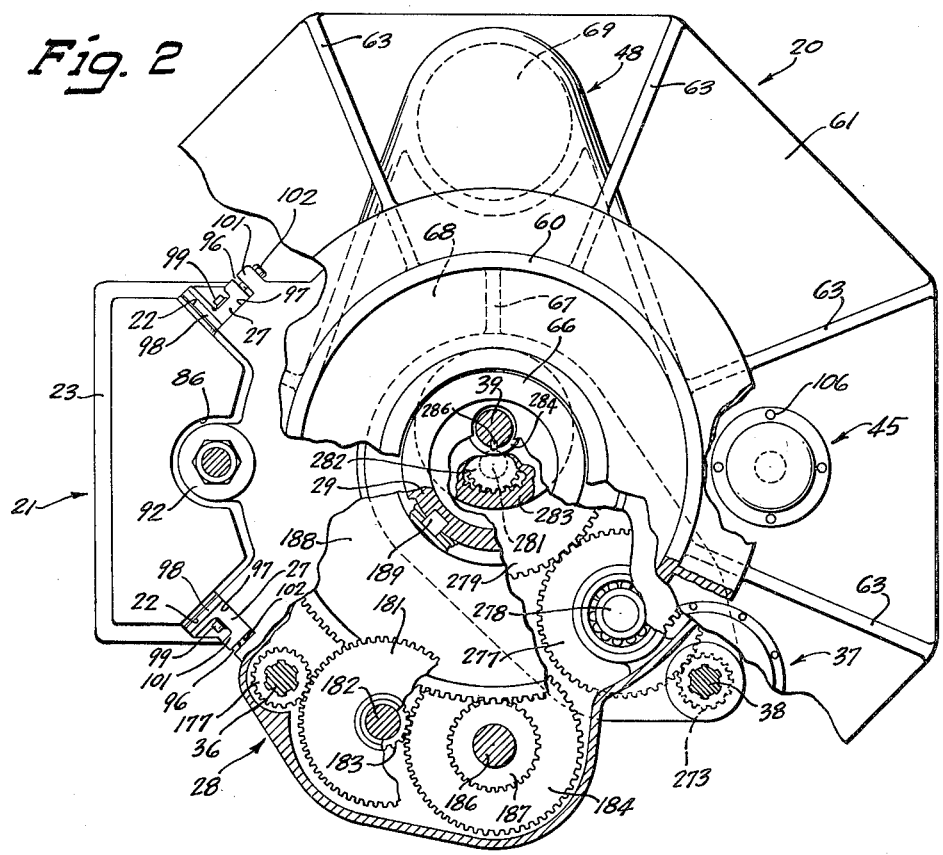
FIG. 2 is a view partially in plan and partially in section showing a side member with its associated way and gib members and the gear transmissions for rotating the ram and the cutter.

Reference is now made to the drawings, and specifically to FIGS. 1 and 2 thereof showing a machine tool, comprising essentially a base 20 to which there is secured a depending U-shaped frame 21. As best shown in FIG.

2, a set of angularly disposed ways 22 are formed on each of a pair of side members 23 and 24 of the depending frame 21 for engagement with cooperating sets of gibs 27, one set of which is shown in FIG. 2, adjustably secured to the sides of a ram head 28 for slidably supporting the ram head on the frame 21. The ram head 28 rotatably supports one end of a ram 29 which extends through the base 20. At its extending end, as best shown in FIG. 3, the ram 29 supports a cutter head 31 which rotatably supports a cutter 32. The cutter head 31 is eccentrically disposed on the end of the ram 29 so that rotation of the ram will effect gyratory movement of the cutter head and its associated cutter 32 while the latter is being rotated about its axis. The ram 29 is rotated by power obtained from an electric motor, the power being transmitted from the motor through a right angle drive mechanism 34 to a splined shaft 36 and thence to a gear train carried within the ram head 28 to the ram to rotate it and its associated cutter head 31. The cutter 32 is rotated by power obtained from another electric motor (not shown) and transmitted through a right angle drive mechanism 37 to another splined shaft 38 and thence to another gear train carried within the ram head 28 to a spindle drive shaft 39 to rotate a spindle 41 and the cutter 32 thereon.

As previously mentioned, the ram head 28 is slidable on ways 22 to effect vertical movement of the cutter 32. Power means are provided for actuating the ram head 28 in its path of movement at a predetermnied uniform rate. Such power means may be of any well known type, as for example, a screw and nut mechanism operated by an electric motor in a well known manner, or the ram head may be actuated by hydraulic mechanism, as employed in the illustrative embodiment. To this end, two piston and cylinder mechanisms 44 and 45 are connected to actuate the ram head 28 in its path of travel.

The base 20 supports a cylindrical reactor or container 47 which contains a solid mass of material which the cutter 32 removes in the form of uniform chips. It is to be noted that this machine tool has for its sole purpose the production of chips as an end result, while generally, machine tools serve the purpose of producing a required form as an end result with the chips being waste material.

In order that the machine tool will occupy a minimum amount of floor space and to facilitate placement and removal of the container 47, the machine is designed to operate in a vertical position. To this end, as seen in FIG. 1, the machine tool is recessed into the floor in a pit 51 which has an enlarged top portion 52 forming a circular ledge 53 on which the base 20, the ram drive motor and the spindle drive motor are supported. A cover 54 spans the space around the machine tool to permit operating personnel to walk around the machine.

The ways 22 are disposed on the side member 23 and 24 of the frame in a vertical plane. The ram 29 is supported with its axis in the vertical plane, parallel to the ways 22, so that when the ram 29 is rotated and moved upwardly from the bottom of the machine, the cutter head 31 and cutter 32 will be moving upwardly with it into the container 47 in a spiral feeding movement.

The base 20 includes a generally circular hollow column 60 and a relatively large annular base flange 61 through which bolts are inserted into engagement with the ledge 53 anchoring the machine tool in place. The column 60 is reinforced by a plurality of vertical ribs 63 which extend from the base flange 61 to a somewhat smaller top flange 64. Within the column 60 and extending upwardly from the base flange 61 there is provided a sleeve 66 which rotatably and slidably supports the ram 29 in a vertical position. The sleeve 66 is rigidly supported in a vertical position by means of reinforcing webs 67, FIG. 6, that extend between the outer surface of the sleeve 66 and the inner surface of the column 60. The chips produced by the cutter 32 fall into the space between the column 60 and the sleeve 66 on to an inclined plate 68, illustrated in FIG. 2, provided therein. At the lower edge of the plate 68 there is provided a chip chute 48 having an outlet 69 in the base flange 61 by which means the chips are conveyed to a suitable conveyor or receptacle (not shown) for further handling.

The top flange 64 of the base 20 has its top surface 70 finished to receive in tight engagement a platen spacer 72. At the inner edge of the flange 64 there is formed an annular groove (not shown). Seated on the flange 64 is the platen spacer 72 having a top and bottom flange 74 and 75, respectively. The under surface 77 of the bottom flange 75 is finished to mate with the top surface 70 of the top flange 64 of the base 20 and the engagement between the two members is tight, insuring a substantially dust proof joint. Bolts inserted through the flanges 64 and 75 secure the platen spacer to the base.

The top flange 74 of the platen spacer 72 is formed identical to the flange 64 of the base and has a similar finished seating surface 78 and an annular groove for receiving a work platen 79. The work platen 79 is a ring like member which when seated upon the spacer 72 overhangs the flange portion 74, as best shown in FIG. 9. The bottom surface of the platen is finished to seat upon the finished top surface of the flange 74 for a substantially dust proof joint. The inner bottom edge of the platen is provided with a depending ring 81 which mates with the annular groove provided in the flange 74. Thus, the platen 79 is interlocked in alignment with the spacer 72.

The top surface of the platen is finished for a bearing engagement with a flange portion 82 of the container 47. The platen 79 is secured to the spacer by means of screws (not shown), inserted through suitable openings in the platen into threaded engagement with the flange 74 of the spacer 72. The container 47 is secured to the machine by a plurality of clamping mechanisms 85 secured to the peripheral edge of the platen 79 in equally spaced relationship. The clamping mechanism 85 will be described in greater detail later.

The depending U-shaped frame 21 comprises the two side members 23 and 24 which are generally rectangular in cross-section with the angularly disposed way surfaces 22 extending the lengths of the members. The inner surface of each of the side members is recessed at the center to form a U-shaped trough 86 which partially encircles the piston rods of the hydraulic actuators for moving the ram head 28. The side members 23 and 24 are secured to the flange 61 of the base 20 by means of bolts 88. The bottom ends of the side members are rigidly tied together in parallel spaced apart relationship by a cross member 89. The cross member 89 is secured to the side members by means of bolts 91 inserted through flanges provided on the side members 23 and 24 and the cross member 89 for that purpose.

As seen in FIGS. 1 and 2, the ram head 28 is provided with two brackets 92 and 93 which extend laterally from the sides of the ram head. To the brackets 92 and 93 are secured the extending ends of a pair of piston rods 94 and 95 which are a part of the mechanism by which the ram head is moved vertically and which will be described subsequently. On either side of each of brackets 92 and 93 there are formed angularly disposed gib supporting mounting notches 96. The notches 96 have a finished surface 97 upon which are adjustably secured the gibs 27. The surfaces of the gibs 27 adjacent to the ways 22 are provided with removable wear plates 98 to engage the ways 22.

The gibs 27 are adjustably secured in the notches 96 by means of bolts 99 that are inserted through slots (not shown) in the gibs and are threadedly engaged with the head 28. The axis of each of the slots is disposed in a plane that is perpendicular to the way surface 22 so that the gibs may be adjusted laterally relative to the way surfaces 22. To adjust the gibs 27 laterally there is provided a flange 101 that extends outwardly of the finished surface 97. A set screw 102, for each gib 27, is threadedly engaged in the flange 101 into contact with the gib 27. Thus, it will be apparent that the ram head 28 may be precisely and accurately adjusted relative to the guiding surface or ways 22 on the side members 23 and 24.

The ram head 28, as previously stated, is moved vertically on the ways 22 by the pair of piston and cylinder mechanisms 44 and 45. The cylinders 103 and 104 of these mechanisms are mounted on the flange 61 of the base 20 and secured thereto by bolts 106. Pistons 107 and 108, shown in FIGS. 1 and 3, reciprocate within the cylinders 103 and 104. The pistons have secured to them the piston rods 94 and 95 which extend through the base flange 61 and have their extending ends secured to the ram head 28 in the brackets 92 and 93, respectively. Hydraulic pressure is supplied to each of the cylinders 103 and 104 simultaneously from a source of hydraulic pressure (not shown).

The ram 29, as stated previously, is supported in a vertical plane within the sleeve 66 for rotational and axial movement therein. As depicted in FIGS. 3 and 6, the sleeve 66 is provided with a recess 110 at its upper end to receive a bearing liner 109 for supporting the ram 29. The liner 109 is provided with an annular flange 111 which seats on the end of the sleeve 66 and through which a series of screws 112 are inserted into threaded engagement with the end of the sleeve to secure the liner in place.

In milling titanium sponge, or any similar type of metal, the action of the cutter on the sponge mass has a tendency to create a considerable amount of dust of fine titanium particles. This dust will settle or be carried into any unprotected openings where it will compact into a solid mass. Therefore, it is necessary that means be provided to effectively seal the space between the movable ram 29 and the sleeve 66. The sealing means employed should also be effective to wipe the peripheral surface of the ram to clean it of any titanium dust that has adhered to it. To this end there is provided a wiper ring, generally denoted by the reference numeral 113, disposed on the end of the sleeve 66 to engage the ram 29. In this position it serves to seal the space between the ram and the sleeve and, also, to wipe the ram surface both in its feeding movement and its retracting movement.

Referring more particularly to FIG. 5 of the drawing, the wiper ring 113 comprises an annular collar 114 which is seated on the end of the sleeve 66. The base or bottom of the collar 114 is provided with a recess 116 of sufficient diameter and depth to encase the flange 111 of the liner 109. The collar 114 is secured to the sleeve 66 by a series of relatively long screws 117, one of which is shown, inserted through suitable openings provided in the collar and threadedly engaged in suitable threaded openings in the end of the sleeve 66.

The collar 114 is provided with an axial recess 118 which is relatively deep. An annular tensioning ring 119 fits snugly in the bottom of the recess 118 and has a bore diameter than is greater than the bore of the collar 114. The tensioning ring 119 is provided with a relatively deep annular groove 121 in its inner surface which is disposed towards the top of the ring 119. In this manner, the top portion 122 of the ring 119 functions as a resilient leaf spring which tends to resist a downward thrust imposed upon it. A pair of centrally apertured angle shaped wiper elements 123 and 124 which have a substantially annular body portion 125, and an annular extending lip portion 126 are carried within the recess 118. The lip portions 126 extend in a radial direction and are obliquely disposed relative to the axis of the collar and are adapted to press against the ram 29. The wiper elements are mounted within the recess 118 in inverted relationship. In this position a free edge 127 of each of the lip portions 126, which are beveled to form a scraping edge, are disposed to wipe the periphery of the ram 29 in both directions of ram travel. The wiper elements 123 and 124 are preferably of tough oil-resistant rubber-like material which is durable enough to resist abrasion of the gritty dust particles of metal, and also to withstand the action of the oil necessarily found on the ram shaft.

The wiper members 123 and 124 are contained within the recess 118 of the collar 114 in opposed relationship by a floating retainer ring 128. The retainer ring 128 is provided with a bore the diameter of which is somewhat greater than the diameter of the ram. To space the ring 128 in the recess 118 and also to serve as a seat for the wiper members, the retainer ring is provided with an outwardly extending annular flange 129 which is located equi-distant from the top and bottom of the ring. The width of the flange 129 is the same dimension as the thickness of the body portions 125 of the wiper members 123 and 124. The dimensions from the ends of the retainer ring 128 to the associated adjacent faces of the flange 129 are identical and each dimension is equal to to the length of the body 125 of the wiper members from the base to the point of intersection of the inner surface of the lip portion 126 and the inner surface of the body of the wiper members. Thus, the edges 131 and 132 of the retainer ring 128 will align with the junction formed by the obliquely disposed lip portions 126 and the body portions 125.

Since the retainer ring 128 is vertically movable within the recess 118 of the collar, the lip portion 126 of the wiper element 124 will bear against the resilient leaf spring 122 of the tension ring 119. Therefore, any downward pressure applied to the wiper element 124 will be resisted by the leaf spring 122 of the tension ring 119. The downward pressure together with the resistance of the leaf spring 122 will urge the lip portion 126 of the wiper member 124 into closer engagement with the periphery of the ram 29. The top wiper member 123 is likewise resiliently retained by another ring 134 which is constructed to encircle the wiper member 123. The ring 134 is provided with a thin inwardly extending slightly inclined flange 136 of a thickness to render it resilient. The body of the ring 134 is also provided with a plurality of openings through which screws 137 are inserted to threadedly engage the collar 114. Thus, all of the parts of the wiper ring 113 when assembled on the ram 29 are retained within the opening 118 of the collar 114 and the pressure applied by the spring like portions 122 and 136 can be varied by tightening the screws 137.

It is evident then, that the scraping edges 127 of the wiper members 123 and 124 can be maintained in a dust sealing and scraping engagement with the periphery of the ram 29 regardless of the wear on the wipers. It is also evident that the wiper members need not be formed as an integral circular member, but may be formed from strip material and inserted into the retainer ring or holder 128. Thus, if the wiper members are formed of a strip material it will be a simple matter to replace worn wipers by simply removing the screws 137 and lifting the ring 134 and retainer ring 128 to expose the wiper member, inserting new strips and reassembling the unit without removing the wiper ring assembly from the ram.

The ram 29 is designed to be rotated as it is moved vertically. To this end, the bottom of the ram is rotatably supported by the ram head 28 in a manner to be movable vertically with the ram head, as best shown in FIG. 3. To support the ram vertically the head is provided with a hub 142 having a recess 143 within which is confined a thrust bearing 144. The lower end of the ram 29 is provided with a reduced portion 146 which is journalled in the thrust bearing 144. A shoulder 147 of the ram formed by the reduced portion 146 and the normal diameter of the ram, seats upon a thrust washer 148 seated on the outer end of the hub. The bearing and washer are secured in place by a nut 149 in threaded engagement with a threaded portion of the hub 142. A bearing liner 151 having an annular flange portion 152 is inserted within the bore of the inner end of the hub 142 to rotatably and slidably support the lower end of the ram 29. The liner 151 is secured to the hub by means of screws (not shown) which are inserted through suitable openings in the flange 152 of the liner into threaded engagement with the end of the hub 142. Thus, as the ram head 28 is actuated upwardly it will move the ram upwardly with it.

Figure 4:
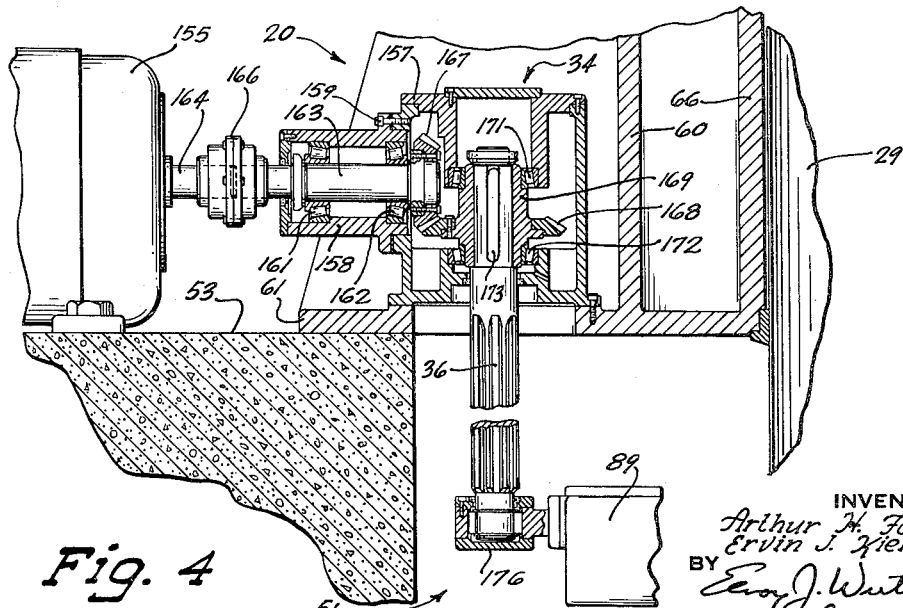
FIG. 4 is an enlarged detail view in vertical section of one of the right angle drive mechanisms taken along the plane represented by the line 4—4 in FIG. 3.

To rotate the ram 29, there is provided an electric motor 155, shown in FIG. 4, which is mounted on the ledge 53 of the pit 51. Power from the electric motor 155 is transmitted through the right angle drive mechanism 34 and the splined shaft 36 to a gear train, disposed within the ram head 28 and generally identified in FIG. 3 by the reference numeral 156. The right angle drive mechanism 34 is contained within a housing 157 mounted on the top surface of the base flange 61 and a power input shaft housing 158 is secured to the housing 157 by means of screws 159. Within the housing 158 there are mounted two antifriction bearings 161 and 162 in which a power input shaft 163 is journalled. The outer extending end of the input shaft 163 is connected to a shaft 164 of the electric motor 155 by a coupling 166. To the inner end of the input shaft 163 there is secured a bevel gear 167 which meshes with a bevel gear 168. The bevel gear 168 is fixed to a sleeve 169 journalled in two antifriction bearings 171 and 172 carried within the housing 157. The upper end of the splined shaft 36 extends into the sleeve 169, within the housing 157 and is secured therein to rotate with it by means of a key 173. The splined shaft 36 extends downwardly and passes through a bracket 174 integrally formed on the ram head 28 and has its lower end journalled in an outboard supporting bracket 176 secured to the cross member 89 of the depending frame 21, as shown in FIG. 1.

Power from the splined shaft 36 is tranmsitted to the gear train 156 by means of an internally splined gear 177 in mating engagement with the splined shaft 36, as best shown in FIGS. 2 and 3. The splined gear 177 is journalled in two antifriction bearings 178 and 179 carried within the bracket 174. The gear 177 meshes with a gear 181 operably connected to rotate a jack shaft 182 rotatably mounted within the ram head 28. A pinion 183 is secured to the jack shaft 182 for rotation therewith and is operably disposed to drive a gear 184 keyed to a jack shaft 186. A pinion 187 is also keyed to the jack shaft 186 to rotate with it and is in meshing engagement with a bull gear 188. The bull gear 188 is mounted on the inner extending end of the ram 29 within the ram head 28 and is operably connected to rotate the ram by keys 189 and 191. The bull gear 188 is retained on the ram 29 by a nut 192 threadedly engaged with the end of the ram. Thus, the ram head 28 is movable vertically to effect axial movement of the ram 29 while the latter is being rotated by power obtained from the electric motor 155.

Attached to the upper end of the ram 29 is a mounting plate 195 for receiving the cutter head 31. The mounting plate 195, as best shown in FIG. 6, has a depending circular locating extension 196 which fits within a recess 197 provided within the end of the ram 29 to locate and orient the mounting plate thereon. The mounting plate 195 is secured to the end of the ram by means of screws 198 inserted through suitable openings in the plate into threaded engagement with the end of the ram. The mounting plate 195 is provided with a finished top surface 194 upon which the cutter head 31 is supported for bodily rotation with the ram 29.

The cutter head comprises a base 201 having a finished bottom surface 202 to mate with the finished surface 194 of the mounting plate 195. Depending from the bottom surface of the base 201 is a circular locating extension 203 which fits within a recess 204 provided in the mounting plate 195 to orient the cutter head 31 in proper position. Depending from the locating extension 203 is a hub 206, the purpose of which will be subsequently described.

From the top surface of the base 201 there is an extending neck portion 207, integrally formed with the base 201, the axis of which is offset relative to the axis of the ram 29 but is parallel therewith. Integrally formed with the neck 207 is a circular support housing 208 which is inclined outwardly relatively to the ram 29. A bore 209 is provided in the base of the supporting member 208, being centrally located therein with its axis inclined to the axis of the ram 29. The end of a spindle shaft 211 is concentrically supported in the bore 209, with a flange 212 provided on the shaft 211 seated upon a mounting pad or base 213 formed on the inner bottom surface of the housing 208. The flange 212 is provided with suitable openings through which screws (not shown) are inserted to threadedly engage into the housing 208 for rigidly securing the shaft 211 to the housing 208. On its top or outer surface the flange 212 is provided with a boss 214 upon which is seated a spacer ring 216. Upon the spacer ring 216 is seated an antifriction thrust bearing 217 with its inner race mounted in snug engagement around a reduced portion 218 of the spindle shaft 211.

The frusto-conical shaped spindle 41 is mounted on the spindle shaft 211 and is rotatably supported at its base by the outer raceway of the antifriction bearing 217. The top portion 219 of the shaft 211 is further reduced and receives an antifriction thrust bearing 221 the outer raceway of which is confined within a recess 222 provided in the top of the spindle 41. The outer end of the spindle shaft is provided with a threaded portion on which is threadedly engaged a locknut 223 to secure the bearing 221 on the shaft the latter operating to secure the spindle 41 on the shaft.

A cap 224 having a frusto-conical form, the conical surface of which is a continuation of the conical surface of the spindle 41, is seated upon the top of the spindle and secured thereto by means of screws 226. The cap 224 effectively prevents dust and dirt from entering into the space between the spindle and spindle shaft and also confines the outer raceway of the bearing 221 within the recess 222. At the outer edge of its base the spindle 41 is provided with an annular notched portion 227 into which is seated a ring gear 228 for rotating the spindle 41 on the shaft 211. The ring gear 228 is secured to the spindle 41 by a plurality of screws 229 which are inserted through suitable openings provided in the spindle and threadedly engaged into the gear 228.

To drive the spindle 41, a drive shaft 231 is rotatably supported within the neck portion 207 of the cutter head 31. The upper end of the shaft 231 has an integrally formed bevel gear 232 thereon which is in constant meshing engagement with the ring gear 228. The shaft 231 is rotatably supported in a pair of antifriction bearings 233 and 234 carried in a bearing retainer 235 housed within a suitable bore 236 that extends through the hub 206, the mounting plate 195, the base plate 201 and the neck 207. The bearing retainer 235 at its lower end is provided with a flange 237 having suitable openings through which screws 238 are inserted into threaded engagement with the hub 206 to secure the retainer 235 within the bore 236. The shaft 231 is provided with a threaded portion 239 on which is threadedly engaged a lock-nut 241 which bears against the inner raceway of the bearing 233 to lock the bearing in the retainer.

It is to be noted that the cutter head 31 and the spindle 41 are so disposed upon the end of the ram 29 that they extend inwardly beyond the axis of the ram 29. Therefore, rotation of the ram will rotate the cutter head in an orbit about the axis of rotation of the ram. Thus, when the ram is both rotated and fed upwardly, simultaneously, the cutter head will have a spiral feeding movement.

In the processing of titanium, the titanium sponge is subjected to a "leeching" process. Thus, if the titanium sponge is removed from the container in the form of chips, and the chips then are subjected to the "leeching" process, it follows that the leeching time will be less for smaller chips of titanium sponge than for a larger mass. It is therefore necessary that the chips of titanium sponge be relatively uniform in cross-sectional area so that the time and the action of the leeching process will be the same for each chip of a batch of chips. Therefore, it has been necessary to provide a novel cutter which can be fed into a mass of titanium sponge within the cylindrical container 47, and which is effective in producing a chip having a uniform cross-section.

While, the condition in which the cutter is presented to the mass of titanium sponge is in the nature of a boring action, the cutter itself must perform a milling operation. The cutter, also, must function in a manner as to produce a segmental type chip rather than the continuous or ribbon type chip. Since pure titanium sponge is extremely reactive to heat, it is also essential that the cutting speed of the cutter be maintained at a relatively low rate to insure that the heat generated by the cutter will be well below the temperature that would cause the titanium to react. Thus, with the cutting speed restricted to a relatively low value, the productivity of the cutter must be maintained by having a great number of cutting teeth or bits in the cutter. To satisfy these requirements and to produce a uniform chip, the individual bits of the cutter must be presented to the mass of titanium sponge in a horizontal plane, due to the fact that the mass of titanium sponge in the container is in the horizontal plane.

To this end, there has been provided the cutter 32 having a body portion 250 of frusto-conical shape, as best shown in FIG. 6. The cutter body 250 has in cross-section the form of a truncated equilateral right angle triangle. While the above described form for the cutter is the one which is preferred, it is not necessary that the cutter be restricted to it, but may have the form, in cross-section, of any equilateral triangle. However, if the cutter is not of the illustrated form, it will be necessary to vary the angle of the axis of the spindle shaft so that the cutter will operate upon the mass of metal within the container 47 in a horizontal plane.

The interior surface 251 of the body portion 250 is formed to mate with the conic surface of the spindle 41 and the spindle cap 224. The cutter 32 is secured to the spindle by means of a nut 252 threadedly engaged on the outer extending end of a stud 253, the stud being threadedly engaged in the end of the spindle cap 224. For insuring that the cutter 32 will rotate with the spindle 41 without slipping, a plurality of keys 254 are secured to the spindle in spaced relationship by screws 256. To prevent titanium dust from entering into the interior of the cutter head 31, the space between the base of the cutter 32 adjacent to the rim of the housing 208 is sealed by a plurality of sealing rings 257.

A plurality of cutting teeth or bits 258 are inserted in the conical surface of the body portion 250 of the cutter 32 and secured therein by suitable locking means 259 in a well known manner. As shown in FIGS. 6 and 7, the cutting teeth 258 are disposed in a plurality of annular series extending from the base of the cutter to the truncated end thereof. The teeth 258 in each annular series are equally spaced and the cutting edge of each tooth or bit is disposed so that its path of travel extends from the edge of the path of travel of the bits in one adjacent annular series to the edge of the path of travel of the bits in the other adjacent annular series so that each tooth in each annular series will have a uniform tooth load. The teeth 258 in adjacent annular series are staggered so that a maximum number of teeth may be inserted into the body portion 250 of the cutter 32 and still provide sufficient body area around the shank of each tooth to insure adequate support. The cutting edges 261 of the individual teeth 258 are disposed on a line parallel to the conic surface of the body portion 250 and in a plane which includes the axis about which the cutter rotates. The height of the bits are uniform and the cutting edge of each bit is on a line which extends radially from the axis of rotation of the cutter 32.

It has been found that the mass of titanium sponge in the container is pure except for a relatively thin layer around the wall and base of the container. This relatively thin layer absorbs impurities which renders the metal unsuitable for further processing. It has been also found that this layer of impure titanium may be left in the container and the container reused without a corresponding increase in the thickness of the impure layer. Thus, it will be noted that the body portion 250 of the cutter 32, in a horizontal plane, extends from approximately one inch of the wall of the container 47, as best shown in FIG. 8, and extends inwardly therefrom to overlap the axis of rotation of the ram 29. Therefore, as shown in FIG. 6, the annular series of teeth adjacent to the truncated end of the cutter 32 is located to extend beyond the axis of rotation of the ram 29.

As best shown in FIG. 7, it is obvious that the teeth in the annular series adjacent the base can not be secured in the body portion 250 because of insufficient stock on the outer edge of the body portion to adequately support the teeth therein. Therefore, as shown in FIG. 8, the cutter is provided at its base with a chamfered surface 262 in which teeth 263 are mounted. The axes of the teeth 263 are inclined inwardly toward the body portion 250 so that sufficient stock of the body portion 250 is available on the outer edge to rigidly support the teeth. Since the teeth in adjacent annular series are staggered, the shank portions 264 of the teeth 263 do not interfere with the teeth 258 of the adjacent annular series. The teeth 263 are provided with cutting edges 265 which are disposed in the same plane in which the cutting edges 261 of the teeth 258 are in. In addition, the teeth 263 are provided, on their edges adjacent to the impure titanium layer, with side cutting edges 266 which edges are substantially perpendicular to the cutting edge 265. The teeth 263, therefore, will perform the same function of producing a uniform chip as do the teeth 258 and will also serve to dress the container leaving a relatively uniform layer 267 of impure titanium along the walls and base of the container 47.

The spindle 41 is rotated by power obtained from an electric motor (not shown) which is supported on the ledge 53 of the pit 51, similar to the electric motor 155 which supplies power for rotating the ram. Power from the electric motor is transmitted through a right angle drive mechanism 37 depicted in FIGS. 1 and 3, which is similar in construction to the right angle drive mechanism 34 previously described. The splined spindle shaft 38, operably connected to be driven by the mechanism 37, extends downwardly and passes through a bracket 270 integrally formed on the ram head 28, and has its lower end journalled in an outboard supporting bracket 271. The brackets 270 and 271 are similar to the brackets 92 and 176, respectively, and therefore, will not be described in detail here.

Power from the splined shaft 38 is transmitted to a gear train 272 by means of an internally splined gear 273 in mating engagement with the splined shaft 38. The splined gear 273 is journalled in two antifriction bearings 274 and 276, carried within the bracket 270. The gear 273 meshes with an idler gear 277 secured to a jack shaft 278 rotatably supported within the ram head 28. The idler gear 277 is in meshing engagement with a gear 279 mounted on a jack shaft 281 rotatably supported in the ram head. The jack shaft 281 has a pinion gear 282 integrally formed thereon. The pinion gear 282 meshes with an internal gear 283 having an outwardly extending hub 284 which receives the lower end of the spindle drive shaft 39. A key 286, shown in FIG. 2, operably connects the shaft 39 to the internal gear 283.

The internal gear 283 is rotatably journalled in two antifriction bearings 287 and 288 carried in a gear housing 289. The gear housing 289 is rigidly secured to the end of the ram 29 by means of screws 291. The lower bearing 288 is secured within the housing 289 by means of a retainer ring 292 which bears against the outer raceway of the bearing 288. The retainer ring 292 is secured to the end of the peripheral flange of the housing by means of screws (not shown). Thus, the internal gear 283 is secured in place through the coaction of the bearings 287 and 288. The shaft 39 extends through the ram 29, its axis coinciding with the axis of the shaft 231 and parallel to the axis of the ram. At its top end the shaft 39 is operably connected to the lower end of the shaft 231 by means of a coupling 293, the ends of each shaft being operably connected to the coupling by means of pins (not shown).

Thus, it is apparent that the combined motion of feeding the cutter into the container, to maintain a uniform depth of cut for each bit, the gyratory movement of the cutter bodily around the axis of the ram to maintain the cutter in proper work position and the rotation of the cutter about its own axis so as to present each individual bit to the titanium sponge mass to effect reduction of the mass to segmental chips produce a chip having a uniform cross-section.

As previously stated the reactor or container 47 which contains the mass of titanium sponge is cylindrical and supported on the upper end of the base 20 in an inverted position to render its open end accessible to the cutter 32. In this position it is necessary that the container be securely clamped to the base to resist the thrust of the cutter as it is being fed inwardly into it to operate upon the material contained therein. To this end, the container 47 is provided around its outer surface adjacent to the open end, with the annular flange 82 having an annular lip portion 295, as shown in FIG. 9. Since the container 47 is reusable, it is subject to stresses due to the hot molten titanium being poured into the cold container. These stresses cause warpage which deform the container and particularly the flange 82 and lip 295 thereof. In this respect the deformation in the lip may cause the lip to be above or below its normal horizontal position, or may be warped in a wave effect. Therefore, to secure the container to the base 20, clamping means must be used which is capable of being adaptable to the varying location of the lip 295 and still be effective to rigidly clamp the container 47 to the base 20.

To this end, the several clamping mechanisms 85 are secured to the circumference of the work platen 79 and disposed in equidistant spaced relationship. Since all of the clamping mechanisms are the same, a detailed description of one will suffice for all. The clamping mechanism 85 comprises a base plate 296 which is attached to the periphery of the work platen 79. As shown in FIG. 9, the base plate is welded to the work platen 79, but any other convenient means for securing the plate to the platen may be used. A pair of side members 297 and 298 are secured to the base plate 296 and extend inwardly over the top of the platen 79 to a point short of the edge of the lip 295 for clearance purposes. A back plate 299 is welded to the outer end of the base plate 296 and to the ends of the side member 297 and 298 to reinforce the members.

A clamping bar 301 is slidably supported between the two side members 297 and 298 for movement toward or away from the container 47. The clamping bar 301 is provided at its forward end with a pressure pad 302 for the purpose of applying pressure upon the lip 295 of the flange 82 regardless of the warpage in the lip either above or below the normal horizontal plane. Towards the center of the bar 301 there is provided a slot 303 through which a shaft 304 extends. The shaft 304 is threadedly engaged with a threaded opening in the work platen 79 and extends above the clamping bar 301. The lower portion of the shaft 304 is embraced by a compression spring 306 having a clamping bar supporting plate 307 which slidably supports the clamping bar 301. The spring 306 is of sufficient length to yieldably lift the pressure pad 302 of the bar 301 clear of the lip 295. The upper extending end of the shaft 304 is threaded to receive a hand nut 308. The hand nut 308 bears upon a washer 309 which is provided with a convex bottom surface 310. The washer 309, in turn, is in bearing engagement with another washer 311 having a concave top surface 315 which receives the convex surface of the washer 309. The washer 311 seats upon the top surface of the clamp bar 301 to transmit the force exerted by the clamp nut 308. Due to the convex and concave surfaces of the washers 309 and 311, respectively, the top surface of the washer 309 will always be in full contact with the hand nut 308 and the bottom surface of the washer 311 will always be in full contact with the top of the clamp bar 311. This condition will be maintained regardless of whether the clamp bar 301 is inclined above or below the horizontal plane. The convex and concave surfaces of the washers 309 and 311 function to equalize the difference in elevation from the horizontal from which the clamp bar may be inclined. The bar 301 at its outer end is provided with a handle 312 by which means the bar 301 is moved manually into and out of clamping position.

To actuate the clamping bar 301 into clamping engagement with the lip 295 of the container 47, upward pressure is exerted upon the outer end of the bar 301 by means of an eccentric roller 313. The eccentric roller 313 is mounted on a splined portion 314 of a shaft 316, the enlarged outer end of which is journalled in a bearing sleeve 317 carried within a trunnion 318 secured to the side member 297, as shown in FIG. 10. A set screw 319 threadedly engaged in a suitable threaded opening in the trunnion 318 engages a recess 321 formed on the outer periphery of the bearing sleeve 317 to secure the sleeve within the trunnion.

As best seen in FIG. 10, the opposite side member 298 carries a hydraulic motor mounting bracket 322. The bracket 322 is provided with a hub 323 which extends from both sides of the bracket. The inwardly extending portion 324 of the hub extends through the side member 298 through a suitable opening provided therein. The outwardly extending portion 325 of the hub is provided on its outer end with an annular flange 326 to which is secured a hydraulic motor 327. A power shaft 328 of the motor 327, has a splined end that extends inwardly into the outer hub portion 325 of the bracket 322 and is operably connected to the splined end 314 of the shaft 316 by an internally splined coupling 329. The coupling 329 is journalled in a sleeve bearing 331 carried within the hub 323. The sleeve bearing is provided with an annular groove 332 which is engaged by the end of a set screw 333 to prevent axial movement of the sleeve within the hub. The set screw 333 is threadedly engaged through a suitable threaded opening provided in the hub portion 325. The eccentric 313 is provided with a series of cam surfaces which will progressively engage the bottom surface 334 of the clamping bar 301 to exert an upward pressure on the outer end of the bar when the eccentric 313 is rotated by the motor 327. As pressure is applied to the outer end of the bar 301, by the cam surfaces on the eccentric 313, the bar pivots about the washers 309 and 311 to move the pressure pad 302 downwardly to apply a pressure upon the lip 295 and thereby force its associated container 47 into tight engagement with the work platen 79 to clamp the container in position for the cutter 32 to operate upon the material contained therein.

In practice, the hydraulic motors of the several clamping mechanisms 85 are connected to be actuated simultaneously. Thus, in operation, the clamping bars 301 are moved horizontally into clamping position manually by means of the handles 312. The hand nut 308 is then tightened to adjust the bar into the proper position against the upward pressure of the spring 306. When all of the bars of the several mechanisms have been so positioned, the hydraulic motors are actuated simultaneously to rotate the various eccentrics and thereby clamp the container to the platen. To release the container, the hydraulic motors are reversed, to relieve the clamping pressure, the hand nut 308 is released to permit the spring 306 to lift the bar 301 free of the lip 295 of the container and enable the bar to be manually moved free and clear of the lip.

The several operating mechanisms of the machine are under the control of an electrical control circuit (not shown) which is actuated selectively by manipulating a plurality of switches mounted in a control panel 336. The control panel 336 is mounted on the floor at the edge of the pit 51 adjacent to the machine tool.

From the foregoing detailed description of an explanation of the operation of the exemplifying machine tool herein set forth as a practical embodiment of the present invention, it will be apparent that there has been provided an improved machine tool especially adapted for machining a solid mass of material out of a container in the form of relatively uniform chips.

Although the illustrative embodiment of the invention has been described in considerable detail for the purpose of disclosing a practical operative structure whereby the invention may be practiced advantageously it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool for machining a mass of material out of a cylindrical container; a base adapted to support said container in an inverted position; a ram supported by said base for rotational and axial movement in position so that its axis coincides with the axis of the container supported on said base; a cone shaped cutter rotatably mounted on said ram in position to generate a conical surface tangent to a plane that is transverse and radial to the axis of said ram, said cutter being disposed on said ram to rotate bodily in an orbit with the rotation of said ram and to move with the axial movement of said ram into the container for operating on the material therein; operable means connected to rotate the ram; means operably connected to move the ram axially; and means operably connected to rotate the cutter independently of the rotation of said ram; whereby said cutter may be rotated to perform a milling operation upon material within the cylindrical container as it is fed into said container.

2. In a machine tool for machining material out of a cylindrical container; a frame; a driving head slidably supported on said frame; a ram supported by said frame for rotational and axial movement therein, said ram having one end rotatably mouted in said driving head and the opposite end of said ram extending beyond said frame; means connected to support said container in an inverted position on said frame in sealed engagement therewith, the axis of said container when supported on said frame coinciding with the axis of said ram; a cutter head secured to the extending end of said cam to rotate with said ram, said cutter head being disposed on said ram in a manner that the cutter head revolves bodily in a circle about the axis of said ram when said ram is rotated; a cutter rotatably mounted on said cutter head and having an independent axis of rotation which is obliquely disposed relative to the axis of rotation of said cutter head; a cutter drive shaft journalled in said ram and operably connected to rotate said cutter; a first transmission in said driving head operably connected to drive said cutter drive shaft; a source of power connected to actuate said first transmission; a second transmission in said driving head operably connected to rotate said ram; a source of power connected to actuate said second transmission; and means operably connected to move said ram axially; whereby said ram is rotated while being moved axially to feed said cutter into said container in a spiral feeding movement as the cutter is rotated about its own axis to reduce the material in said container to chips.

3. In a machine tool for machining a mass of material out of a cylindrical container; a base; a supporting collar on said base adapted to support a cylindrical container in an inverted position and in axial alignment thereon; means operable to releasably secure said container on said collar; a ram rotatably mounted in said base with its axis coinciding with the axis of said collar and adapted to be axially movable therein; a cutter head secured to one end of said ram and eccentrically disposed relatively to the axis of said ram; a cone shaped cutter rotatably mounted on said cutter head, the rotational axis of which is disposed in a plane which intersects the axis of rotation of said ram; so that rotation of said cutter will generate a conical surface tangent to a plane transverse to the axis of said ram; means operably connected to move the ram axially; means operably connected to rotate the ram as said ram is moved axially whereby said cutter is moved into the container in a spiral motion; and means to rotate the cutter about its axis as it is fed inwardly into said container.

4. In a machine tool for machining a mass of material out of a cylindrical container having an axial opening; a frame; a work platen mounted on said frame and adapted to support said container in position with its axial opening downward; a driving head slidably supported on said frame for axial movement; means operably connected to move said head axially; a ram rotatably mounted in said frame and supported by said frame for axial movement with its axis coinciding with the axis of the container on said work platen, one end of said ram being rotatably supported in said driving head and connected to move axially therewith, the opposite end of said ram extending beyond said frame in position to move inwardly into the container supported on said frame; a cutter head secured to the extending end of said ram to revolve with it, said cutter head being disposed on said ram so that it will rotate bodily in an orbit with the rotation of said ram; a spindle on said cutter head adapted to rotatably support a cutter; a cone-shaped cutter secured to said spindle and adapted to be independently rotated thereon, said cutter being positioned so that it rotates bodily with said cutter head with its bodily path of rotation overlapping the axis of rotation of said cutter head, said cutter having its axis of rotation obliquely disposed relative to the axis of said ram so that the cutting surface thereof will generate a conical surface tangent to a plane that is transverse to the axis of said ram; a driving shaft journalled in said ram, one end of which is operably connected to drive said cutter and the opposite end extending into said driving head; a first transmission within said driving head operatively connected to said driving shaft; power means connected to drive said first transmission, a second transmission within said driving head and operatively connected to rotate said ram; and power means connected to drive said second transmission.

5. In a machine tool for machining a mass of materail out of a cylindrical container having an axial opening; a main frame having an opening therethrough; a support secured to said main frame to support the container with its opening axially aligned with the opening in said main frame; a bearing sleeve within the opening in said frame and secured to said main frame; a ram rotatably and slidably journalled in said sleeve, the ends of said ram extending outwardly of said main frame; a subframe depending from said main frame; a ram head slidably carried by said subframe, said ram head rotatably supporting one end of said ram and being secured thereto to actuate said ram axially; a frusto-conical cutter rotatably secured to the opposite end of said ram for rotation with it bodily around the axis of said ram and for independent rotation around its own axis with its axis of rotation being obliquely disposed relative to the axis of said ram, said cutter being positioned on said ram so as to overlap the axis of the container and extend therefrom to a point short of the side of the container and also to generate a conical surface tangent to a plane transverse to the axis of the container; means operably connected to move said ram head axially; drive means operably connected to rotate said ram as it is moved axially; and a second drive means operably connected to rotate said cutter about its own axis as it rotates and moves axially with said ram; whereby said cutter may be fed into the container in a spiral feeding movement, and the cutter may be rotated to machine the mass of material out of the container.

6. In a machine tool for machining a mass of materail out of a cylindrical container; a frame; a ram head slidably supported on said frame for vertical movement; a vertically disposed ram having one end journalled in said head in a manner to be movable vertically with said head, said ram extending upwardly through said frame and supported therein for rotational and axial movement; a cutter carrying head secured to the upper end of said ram and disposed eccentrically thereon in a manner to overlap the axis of said ram; a cutter having a frusto-conical form rotatably mounted on said head, the axis of rotation of which is inclined in a manner that said cutter will generate a conical surface tangent to a horizontal plane; a pair of fluid actuators secured to said frame and operably connected to said ram head to actuate it vertically; a first gear train in said ram head operably connected to rotate said ram; a first source of power operably connected to drive said first gear train; a second gear train in said ram head operably connected to rotate said cutter; and a second source of power operably connected to drive said second gear train; whereby said ram is rotated and moved axially and said cutter is rotated with said ram in a path of movement which overlaps the axis of rotation of said ram, and said cutter is rotated independently of said ram.

7. In a machine tool having an elongated vertical member which is rotatable and movable axially in a vertical direction; a cutter carrying head secured to one end of said movable member with its axis parallel to but offset from the axis of said member, said head having a housing inclined outwardly relative to the axis of said movable member; a spindle shaft secured in said housing the axis of which is obliquely disposed relative to the axis of said movable member; a spindle of frusto-conical form rotatably mounted on said shaft; a ring gear secured concentrically to said spindle to rotate it; a vertical drive shaft journalled in said head; a gear secured to said drive shaft in meshing engagement with said ring gear secured to said spindle to drive it; a cutter of frusto-conical cap form secured to said spindle and provided with a plurality of cutting elements, said cutting elements being disposed in a plurality of annular series upon the conical surface of the cutter with each of said cutting elements in adjacent annular series being staggered relative to each other and the cutting edge of each of said cutting elements converging toward the vertex point of said cutter, said spindle having an axis of rotation inclined in a manner such that said cutting elements generate a conical surface tangent to a plane that is transverse to the axis of the movable member so that the cutting elements form a flat surface on the workpiece being operated upon; and power means operably connected to drive said drive shaft.

8. The method of removing a mass of material from a cylindrical container in the form of uniform chips which comprises positioning the container on a supporting surface with its open end downward, presenting the cutting elements of a cone-shaped cutter to the material transverse to the axis of the container, causing relative motion between the cutter and container about the axis of the container as the cutter is being presented to the material and rotating the cuter about its own axis.

9. The method of removing a mass of material from a cylindrical container in the form of uniform chips which comprises positioning the container on a supporting surface with its open end downward, presenting the cutting elements of a cone-shaped cutter to the material in a plane transverse to the axis of the container, effecting relative movement between the cutter and the container in an orbital path about the axis of the container as the cutter is being presented to the material and rotating the cutter about its own axis.

10. The method of removing a mass of material from a cylindrical container in the form of uniform chips which consists of positioning the container on a supporting surface with its open end downward, presenting the cutting elements of a cone-shaped cutter to the material in a plane which is transverse to the axis of the container in a spiral feeding movement, and rotating the cutter about its own axis as the cutter is being presented to the material in the spiral feeding movement.

11. In a machine tool for removing a mass of material from a cylindrical container in the form of uniform chips comprising in combination; a base; an elongated vertical ram rotatably and slidably supported in said base; driving means operably connected to rotate said ram; means operably connected to actuate said ram axially in a vertical direction; a cutter head mounted on one end of said ram, said cutter head having an axis offset relative to the axis of said ram but disposed parallel thereto; a spindle rotatably mounted on said cutter head on an axis which is obliquely disposed relative to the axis of said cutter head and said ram; a cutter body of frusto-conical cap form removably secured to said spindle to rotate with it, the truncated end of said cutter body being disposed to overlap the axis of said ram, the axis of said spindle being inclined at an angle so that said cutter body will generate a conical surface tangent to a horizontal plane; a plurality of cutting bits removably secured in said cutter body, said bits being disposed upon the conical surface of said cutter body in a plurality of annular series, the bits in each annular series being spaced equidistance apart from each other, and the bits of each annular series being staggered relative to the bits in adjacent annular series, said cutting bits having cutting edges along lines which are parallel to the conical surface upon which they are mounted and which intersect the axis of said cutter body; clamping means operable to secure said container on said machine to permit entry of said cutter therein; and means operably connected to rotate said cutter; whereby said bits are presented to the material within the container at a uniform rate to reduce the material to uniform chips.

12. In a metal cutter of the inserted tooth type; a frusto-conical body member; a plurality of annular series of cutting teeth removably secured in the conical surface of said body member; the cutting teeth of adjacent series being offset relative to each other; the axes of said teeth being perpendicular to the plane of the surface in which they are secured; the cutting edge of each of said teeth being parallel to the surface of said body member and in a plane which includes the axis of said body member, said cutting teeth in each annular series being arranged so that the path of the cutting edges of the teeth in an annular series overlaps the path of the cutting edges of the teeth in another annular series; and individual means carried by said body member in position to lock individual ones of said cutting teeth in said body member, whereby each of said cutting teeth may be individually removed or inserted into position in said body member without disturbing the arrangement of the cutter as a unit.

13. In a cutting tool; a cutter carrying head having a

17 base of circular configuration adapted to be mounted on other structure; a drive shaft journalled in said base, the axis of which is parallel to but offset from the axis of said base; a beveled pinion secured to the inner end of said drive shaft; a spindle mounted on said head, the axis of which is obliquely disposed relative to the axes of said drive shaft and said base, and positioned to intersect the axes of said shaft and said base; a pair of antifriction bearings mounted on said spindle; a frusto-conical cutter carried by said spindle and rotatably supported on said bearings in a manner that the conical surface of said cutter is tangent to planes which are parallel to the axis of said drive shaft and perpendicular thereto; and a bevel gear secured to the inner surface of said cutter in constant meshing engagement with said beveled pinion.

14. A cutting tool for milling a mass of material out of a cylindrical container; a body portion of frusto-conical form; and a plurality of cutting elements removably secured in said body portion, said cutting elements being arranged in a plurality of annular series, the cutting elements of the outermost annular series adjacent to the base of said body portion being angularly disposed relative to the cutting elements in the other of said annular series to be inclined toward said base to extend beyond the edge of said base, all of the cutting elements having their cutting edges parallel to the surface of said conical body portion and converging toward the axis of rotation of the body portion, and in addition thereto the cutting elements in the outermost annular series adjacent to the base of said body portion being provided with cutting edges which are in planes perpendicular to the cutting edges which converge toward the axis of rotation of the body portion, the cutting elements in adjacent annular series being staggered relative to each other, said cutting teeth in each annular series being arranged so that the path of the cutting edges of the teeth in one annular series overlaps the path of the cutting edges of the teeth in another annular series.

15. In a machine tool for removing a mass of material from an open end container; a frame; a source of power; a ram head slidably supported by said frame; a hollow ram having one end journalled in said ram head to be movable translationally therewith and extending outwardly thereof; ram rotating means carried by said ram head for movement therewith and operably connected to be actuated by said source of power and to rotate said ram when actuated; means operably connected for rigidly supporting a container on said frame with the axis of the container in substantial alignment with the axis of said ram and the open end of the container facing the extending end of said ram so that said ram may be moved into the interior of the container; a cutter head fixed to the extending end of said ram, said cutter head being offset from the axis of said ram so that it will rotate bodily in an orbit with the rotation of said ram; a cutter rotatably supported by said cutter head for independent rotation about its axis and for bodily movement with said cutter head in its orbital path, the cutting surface of said cutter being tangent to a plane transverse to the axis of said ram with the cutting surface in said transverse plane overlapping the axis of said ram and extending outwardly from the axis of said ram toward the periphery of the container; a cutter drive shaft rotatably supported within said ram and having one end extending into said ram head with its opposite end connected to rotate said cutter about its axis; drive shaft actuating means supported by said ram head for movement therewith and connected to be actuated by said source of power to rotate said cutter drive shaft for rotating said cutter relative to said cutter head; and means operably connected to actuate said ram head in its path of movement for effecting a like translational movement of said ram and its associated cutter head while maintaining the driving connection for rotating said ram and said cutter; whereby said cutter may be rotated about its axis while it is rotating bodily in an orbit and while it is moving upwardly with said ram into the container to produce a spiral feeding movement for progressively operating upon the material in the container to remove the material from the container.

16. In a machine tool for removing a mass of material from an open end container; a frame; a source of power; a support mounted on said frame and adapted to support a container; a plurality of clamps on said support operable when actuated to rigidly clamp a container to said support; a ram supported by said frame for rotational movement about its axis and for axial movement with the axis of said ram being in substantial alignment with the axis of the container in said support and having one end facing the opening of the container so that said ram may be moved axially into the interior of the container; ram rotating means operable connected to be actuated by said source of power and to rotate said ram when actuated; a cutter head mounted on the end of said ram that faces the opening of the container but offset from the axis of said ram so that it will rotate bodily in an orbit with the rotation of said ram; a spindle of frusto-conical configuration rotatably supported by said cutter head with its axis disposed at an angle to the axis of said ram; a cutter of frusto-conical cap configuration secured to said spindle in nesting relationship to rotate with it so that the cutting surface of said cutter generates a conical surface tangent to a plane that is transverse to the axis of said ram while overlapping the axis of said ram and extends outwardly from the axis of said ram toward the periphery of the container; spindle rotating means operably connected to be actuated by said source of power and to rotate said spindle and its associated cutter relative to said cutter head when actuated; and ram actuating means operably connected to actuate said ram in its axial movement toward and away from the interior of the container while maintaining the driving connection for rotating said ram and said spindle; whereby said cutter may be rotated independently about its axis while it is rotating bodily in an orbit with said ram and while it is moving into the interior of the container with said ram to produce a spiral feeding movement for progressively operating upon the material in the container to remove the material therefrom.

17. In a machine tool for removing a mass of material from an open end container; a frame; a source of power; a support secured to said frame and arranged to rigidly support a container in an inverted position for the removal of the material therefrom; a column carried by said frame located beneath the opening of the container on said support and operable to serve as a conduit to receive the material that is separated from the mass in the container; a chute carried by said column and arranged to direct the material that is received within said column into a definite path out of said column; a ram supported by said frame for rotational movement about its axis and for axial movement with the axis of said ram being in substantial alignment with the axis of the container on the support, said ram extending through said column with one end facing the open end of the container so that it may be moved axially through the opening in the container; ram rotating means operably connected to be actuated by said source of power and to rotate said ram when actuated; a cutter head mounted on the end of said ram adjacent to the container for entrance into the container through its opening by the axial movement of said ram, said cutter head being offset from the axis of said ram so that it will rotate bodily in an orbit with the rotation of said ram; a spindle of frusto-conical configuration rotatably supported by said cutter head with its axis disposed at an angle to the axis of said ram; a cutter of frusto-conical cap configuration secured to said spindle in nesting relationship to rotate with it in position so that the cutting surface of said cutter generates a conical surface tangent to a plane that is transverse to the axis of said ram with the cutting surface overlapping the axis of said ram and extending outwardly from the axis of said ram toward the periphery of the container; cutter rotating means operably connected to be actuated by said source of power to rotate said cutter relative to said cutter head when actuated; and ram actuating means operably connected to actuate said ram in its axial movement toward and away from the interior of the container while maintaining the driving connection for rotating said ram and said cutter; whereby said cutter may be rotated independently about its axis while it is rotating bodily in an orbit with said ram and while it is moving into the interior of the container with said ram to produce a spiral feeding movement for progressively operating upon the material in the container to reduce the mass to fragments that drop into said column and are directed therefrom by said chute to a definite location.

References Cited in the file of this patent

UNITED STATES PATENTS

| Number | Name | Date |
|---|---|---|
| 510,455 | Wantling et al. | Dec. 12, 1893 |
| 1,075,722 | Pauling | Oct. 14, 1913 |
| 1,238,757 | Gardner | Sept. 4, 1917 |
| 1,287,285 | Gammeter | Dec. 10, 1918 |
| 1,302,058 | Layne | Apr. 29, 1919 |
| 1,316,718 | Hall | Sept. 23, 1919 |
| 1,388,490 | Suman | Aug. 23, 1921 |
| 1,409,557 | Lincoln et al. | Mar. 14, 1922 |
| 1,427,524 | Edens et al. | Aug. 29, 1922 |
| 1,472,617 | Schwartz | Oct. 30, 1923 |
| 1,657,713 | Gould | Jan. 31, 1928 |
| 1,676,389 | Fletcher | July 10, 1928 |
| 1,796,458 | Hencken | Mar. 17, 1931 |
| 1,827,085 | Huff | Oct. 13, 1931 |
| 2,095,725 | Whealy | Oct. 12, 1937 |
| 2,102,236 | Johansen | Dec. 14, 1937 |
| 2,121,202 | Killgore | June 21, 1938 |
| 2,290,507 | Thompson | July 21, 1942 |
| 2,299,718 | De Florez | Oct. 20, 1942 |
| 2,318,370 | Burch | May 4, 1943 |
| 2,320,933 | Ilgen | June 1, 1943 |
| 2,322,146 | Kuhn | June 15, 1943 |
| 2,356,947 | Pranger et al. | Aug. 29, 1944 |
| 2,527,068 | Murray | Oct. 24, 1950 |
| 2,728,268 | Clifton et al. | Dec. 27, 1955 |